United States Patent
Chen (10) Patent No.: US 10,393,206 B2
(45) Date of Patent: Aug. 27, 2019

(54) BUFFER DEVICE FOR SMALL-SIZED ROLLER SHADE

(71) Applicant: Chih-Yung Wang, Taipei (TW)

(72) Inventor: Shih-Yuan Chen, Pingtung County (TW)

(73) Assignee: Chih-Yung Wang, Taipei (TW)

( * ) Notice: Subject to any disclaimer, the term of this patent is extended or adjusted under 35 U.S.C. 154(b) by 119 days.

(21) Appl. No.: 15/596,642

(22) Filed: May 16, 2017

(65) Prior Publication Data
US 2018/0334854 A1    Nov. 22, 2018

(51) Int. Cl.
| | | |
|---|---|---|
| F16F 9/32 | (2006.01) | |
| F16F 7/02 | (2006.01) | |
| E06B 9/42 | (2006.01) | |
| E06B 9/50 | (2006.01) | |
| E06B 9/60 | (2006.01) | |

(52) U.S. Cl.
CPC .............. *F16F 9/3278* (2013.01); *E06B 9/42* (2013.01); *E06B 9/50* (2013.01); *F16F 7/02* (2013.01); *E06B 9/60* (2013.01); *F16F 2230/04* (2013.01); *F16F 2232/02* (2013.01)

(58) Field of Classification Search
CPC .......... F16F 15/12; F16F 15/1201; F16F 7/02; F16F 9/2378; F16F 2232/02; E06B 9/40; E06B 9/42
See application file for complete search history.

(56) References Cited

U.S. PATENT DOCUMENTS

| | | | | | |
|---|---|---|---|---|---|
| 2,268,492 A | * | 12/1941 | Maynard | .................. | E06B 9/42 160/248 |
| 4,372,432 A | * | 2/1983 | Waine | ....................... | E06B 9/78 160/307 |
| 5,586,631 A | * | 12/1996 | Benthin | .................... | E06B 9/50 160/297 |
| 6,155,328 A | * | 12/2000 | Welfonder | ................ | E06B 9/42 160/296 |
| 7,147,030 B2 | * | 12/2006 | Dalle Nogare | ........... | E06B 9/56 160/315 |
| 8,695,681 B2 | * | 4/2014 | Daniels | ..................... | E06B 9/50 160/291 |
| 8,893,766 B2 | * | 11/2014 | Bohlen | ..................... | E06B 9/88 160/297 |

(Continued)

*Primary Examiner* — Thomas J Williams
*Assistant Examiner* — James K Hsiao
(74) *Attorney, Agent, or Firm* — Muncy, Geissler, Olds & Lowe, P.C.

(57) ABSTRACT

A buffer device for small-sized roller shade comprises a housing body, a covered cylinder within the housing body, an oil seal over the outer edge of the covered cylinder and sealing with respect to the housing body, a covering body secured onto the housing body, a spring surrounding the outer edge of the covered cylinder away from the housing body and the covering body, a rotating body accommodating the covered cylinder around which the spring is provided, such that the spring and the covered cylinder are combined to rotate, a closure cap connected over the outer edge of the covered cylinder and synchronously rotated therewith, and a securing part away from the housing body while combined with the closure cap and the covered cylinder. Thus, the buffer device is reduced in volume for providing a shade panel with buffer effect in drawing/furling process.

6 Claims, 9 Drawing Sheets

(56) References Cited

U.S. PATENT DOCUMENTS

| | | | |
|---|---|---|---|
| 9,187,951 B2* | 11/2015 | Yu .......................... | E06B 9/322 |
| 9,222,305 B2* | 12/2015 | Di Stefano .............. | E06B 9/68 |
| 2002/0048083 A1* | 4/2002 | Okumura ................. | E06B 9/42 |
| | | | 359/461 |
| 2004/0135022 A1* | 7/2004 | Kosugi .................... | B60J 7/068 |
| | | | 242/396 |
| 2007/0107857 A1* | 5/2007 | Wang ....................... | E06B 9/42 |
| | | | 160/321 |
| 2007/0119552 A1* | 5/2007 | Wang ....................... | E06B 9/42 |
| | | | 160/321 |
| 2008/0173499 A1* | 7/2008 | Allsopp ................... | E06B 9/60 |
| | | | 185/40 R |
| 2009/0078380 A1* | 3/2009 | Cheng ..................... | E06B 9/322 |
| | | | 160/291 |
| 2012/0152470 A1* | 6/2012 | Chen ....................... | E06B 9/42 |
| | | | 160/292 |
| 2014/0014280 A1* | 1/2014 | Bohlen .................... | E06B 9/42 |
| | | | 160/291 |
| 2014/0374036 A1* | 12/2014 | Chen ....................... | E06B 9/60 |
| | | | 160/313 |
| 2015/0308188 A1* | 10/2015 | Lin ......................... | B60J 1/2033 |
| | | | 242/375.3 |
| 2017/0159359 A1* | 6/2017 | Vries ...................... | E06B 9/44 |

* cited by examiner

BUFFER DEVICE FOR SMALL-SIZED ROLLER SHADE

FIELD OF THE INVENTION

The present invention is related to a buffer device for small-sized roller shade, particularly to a buffer device with reduced outer diameter after being wholly assembled, which is applicable to a small-sized roller shade used on a door/window and applicable to a small-sized roller shade used within a car door of limited thickness, so as to achieve a wide application.

BACKGROUND OF THE INVENTION

Curtains used for shading or decoration in residence or offices have been presently popularized. In respect to the way for drawing or furling the curtains, mostly, cords are used for drawing or furling the curtains. However, the curtains are applicable to venetian blinds or curtains drawn and furled toward left and right sides, but not applicable to a one-piece shade. Therefore, the inventor researched, developed and tested a shade device with particular effect. This shade device is provided, at left side of a rail, with a drawing and furling device, which is pulled once for drawing a shade cloth clockwise downwardly and is pulled again for furling the shade cloth counter-clockwise upwardly. When the shade cloth is being furled, it is furled in a gentle manner via a buffer device provided at right side of the rail. However, it is apt to generate noise when the shade cloth is being furled, due to a high coefficient of friction within the buffer device, and thus an increased friction force generated correspondingly.

For the prevention of unduly large noise, Taiwan patent no. 484397, titled "Improvement on buffer device for furl of shade", was filed by the inventor. Referring to FIGS. 1-4, a shade device 1 of that application is constituted by a rail 11, an adjustment device 12, a buffer device 13, a drawing and furling device 14 having an elastic element 141, and a shade cloth 15. In this case, the buffer device 13 includes a housing body 130, a covered cylinder 131 coveredly provided within the housing body 130, a covering body 132 covered inside the covered cylinder 131 and provided at one end thereof with a guide rod 1321, a cap body 133 coveringly provided between the covered cylinder 131 and the housing body 130, respectively, to be coveringly secured and integrated therewith, and a rotating block 134 embeddedly combined with the guide rod 1321 of the covering body 132. Further, lubricating oil injected into the inner edge of the housing body 130 of the buffer device 13 is operated as drag. Thereby, when the shade cloth 15 is being furled, large noise generated due to a high coefficient of mutual friction is not resulted and auditory sensation is then not affected.

Figure 1:
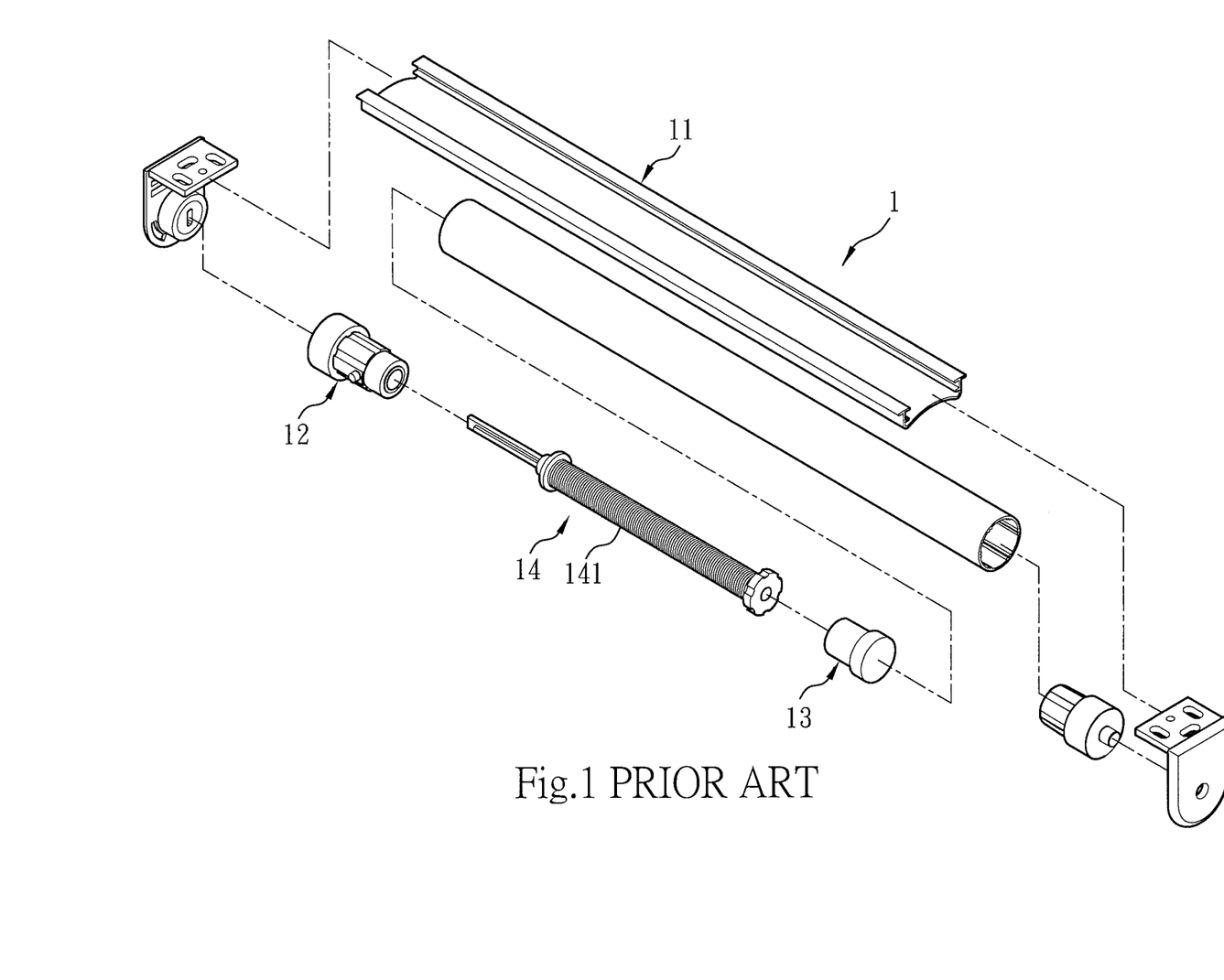
FIG. 1 is an exploded perspective view of a conventional shade device of Taiwan patent no. 484397.
Figure 2:
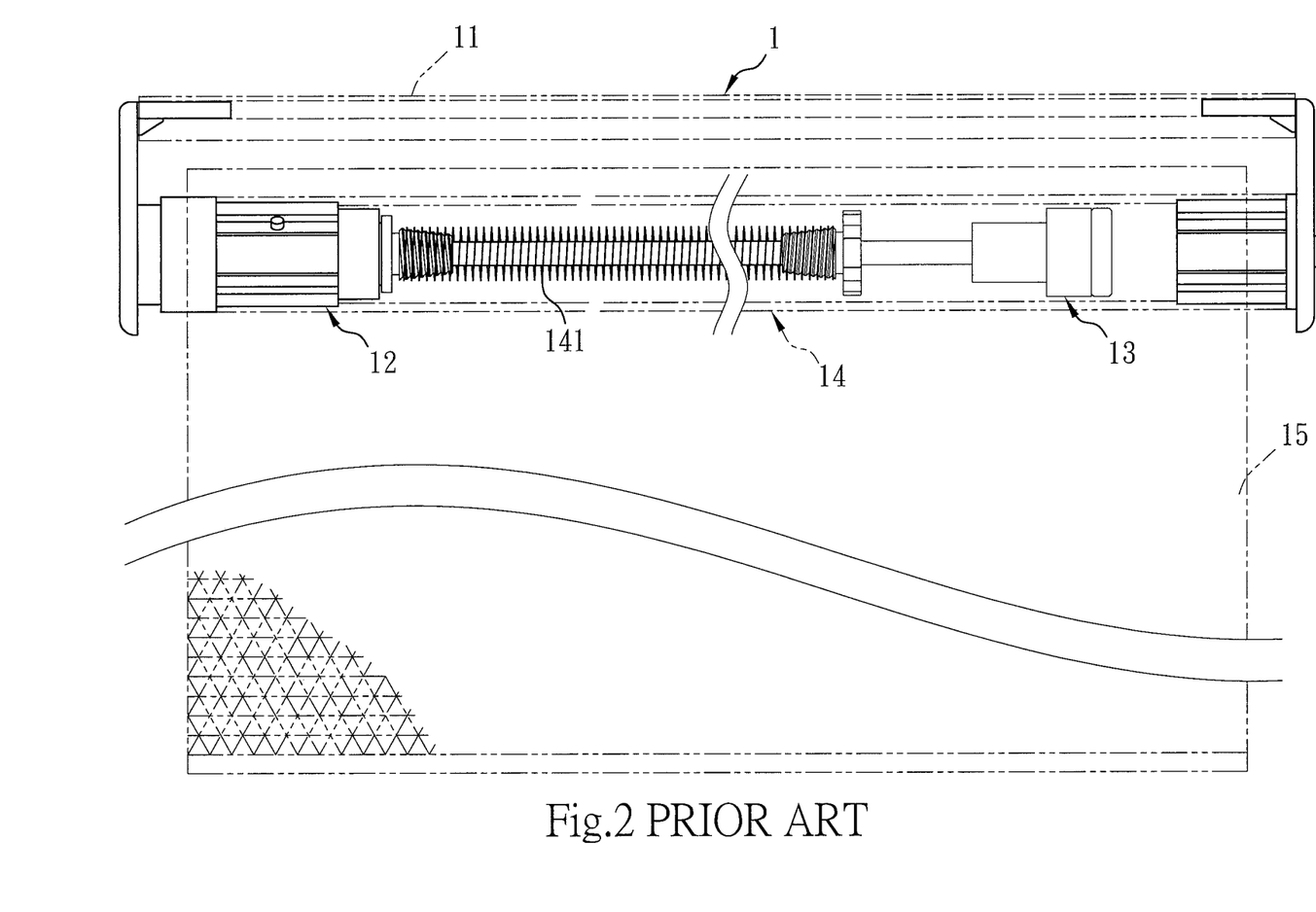
FIG. 2 is an assembled front view of FIG. 1.
Figure 3:
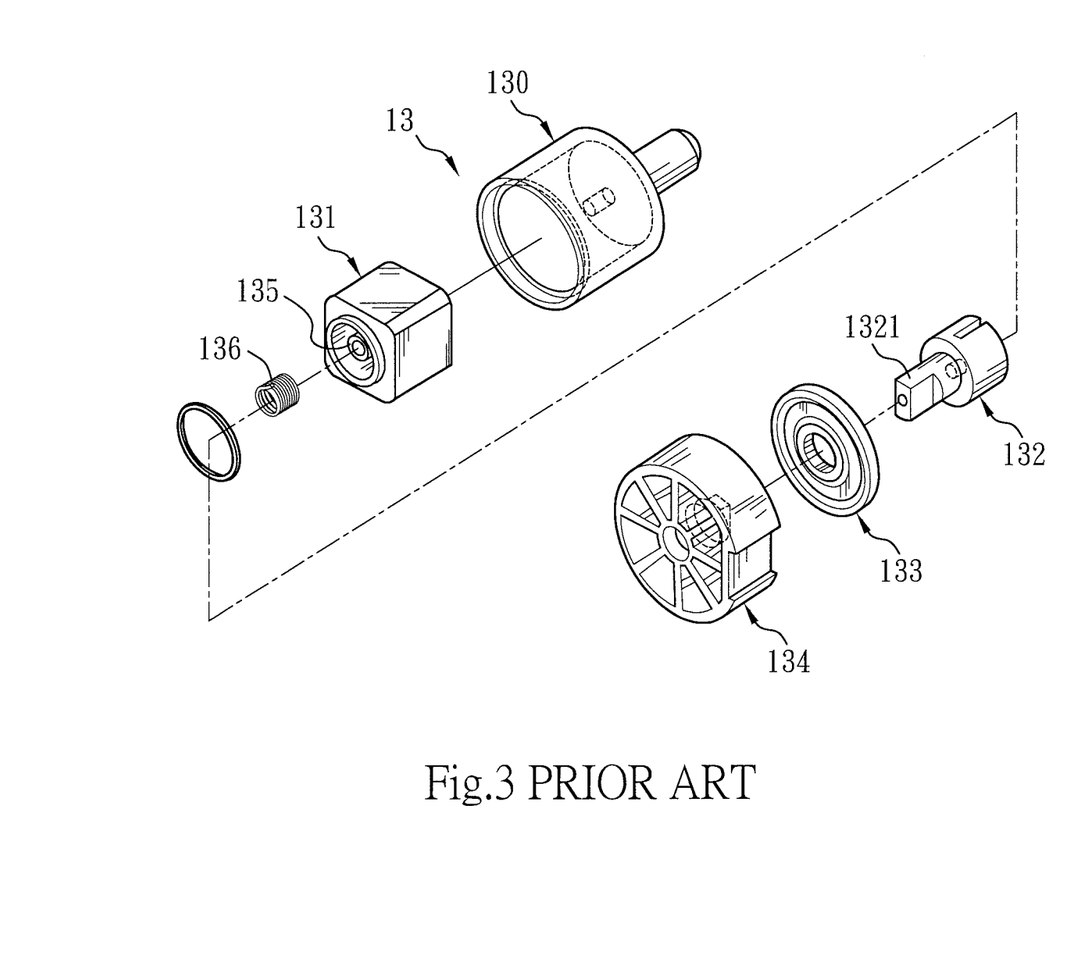
FIG. 3 is an exploded perspective view of a buffer device of FIG. 1.
Figure 4:
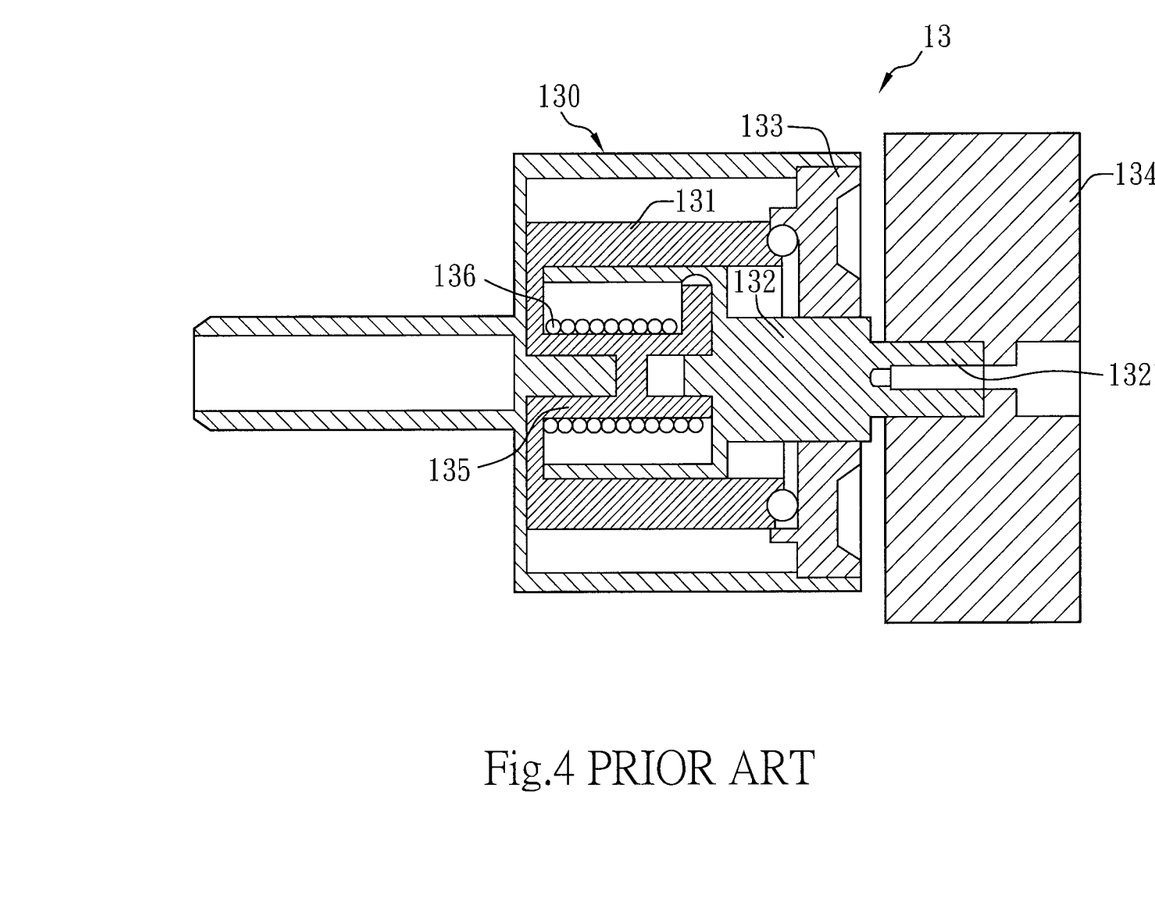
FIG. 4 is an assembled cross section view of the buffer device of FIG. 1.
Figure 5:
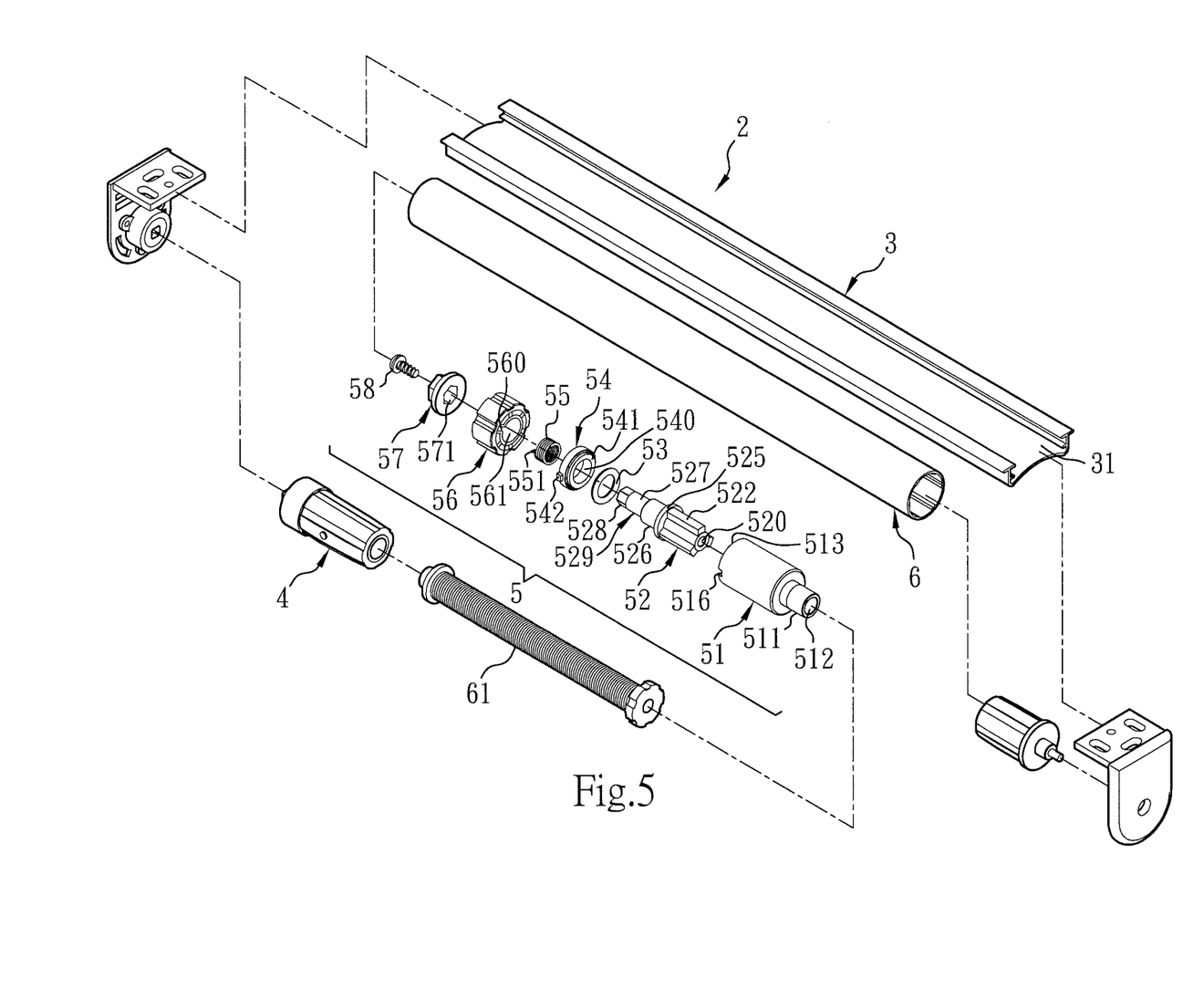
FIG. 5 is an exploded perspective view of a small-sized roller shade of the present invention.
Figure 6:
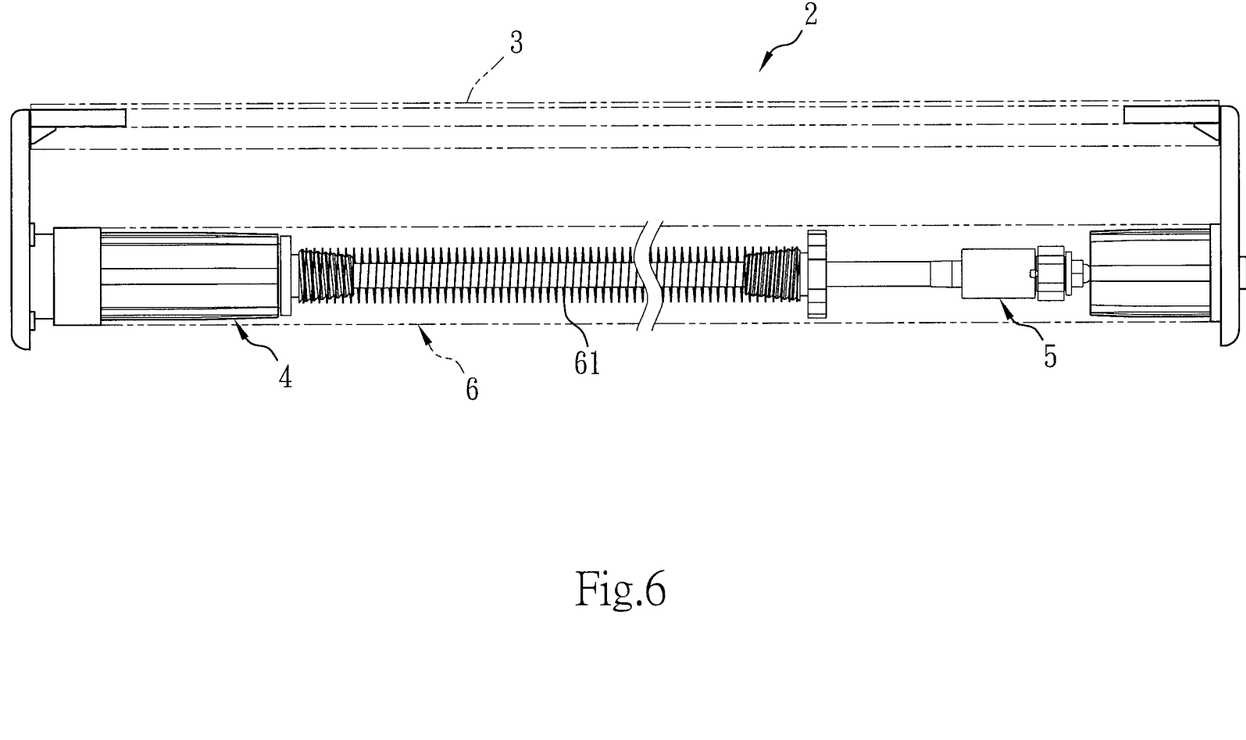
FIG. 6 is an assembled front view of FIG. 5.

It is found that noise generated due to a high coefficient of friction, when the shade cloth 15 is being furled may be avoided in the buffer device 13 of that application. However, a shaft rod 135 is formed within the covered cylinder 131 and a spring 136 is provided around the shaft rod 135. Then, the outer diameter of the covered cylinder 131 should be enlarged, and the enlarged diameter of the covered cylinder 131 is then provided for the spring 136 to be coveredly provided inside. Hence, after the outer diameter of the spring 136 and that of the covered cylinder 131 are added together, the outer diameter of the whole assembled buffer device 13 is further enlarged when the covered cylinder 131 is covered inside the housing body 130 (as illustrated in FIG. 4). Moreover, the manufacturing cost is high. Therefore, it is simple to enlarge the outer diameter of the buffer device 13, while the reduction in the outer diameter of the buffer device 13 is extremely limited. Therefore, it is only possible for the buffer device 13 of that application to be mounted in the shade device 1 used on the door/window, while it is difficult to install this shade device 1 in the small-sized roller shade used within the car door of limited thickness.

SUMMARY OF THE INVENTION

The present invention provides a buffer device for small-sized roller shade, so as to eliminate the above problems of the enlargement of outer diameter of whole assembled buffer device of the shade device with high cost, only possibility of being mounted in the shade device used on the door/window, and difficulty of installing the shade device on the small-sized roller shade used within the car door of limited thickness. Improvement with respect to the above problems, and further, a buffer device for small-sized roller shade overcoming conventional drawbacks are proposed by the inventor.

For achieving the above objects, the technical means utilized in the present invention provides a buffer device for small-sized roller shade, the buffer device comprising a housing body, the housing body being provided at one end thereof with an embeddedly projecting rod, the housing body being formed within one end thereof far away from the embeddedly projecting rod with a first accommodating space; a covered cylinder, the covered cylinder being provided with a column within the first accommodating space of the housing body in which a slight gap is formed between the column and the first accommodating space, a blocking projecting ring coveringly provided in correspondence with the first accommodating space of the housing body, and a projectingly connected portion being far away from the column and extending toward one end of the blocking projecting ring; an oil seal, the oil seal being coveringly provided over the outer edge of the projectingly connected portion of the covered cylinder and sealing with respect to the interior of the first accommodating space of the housing body; a covering body, the covering body being, at one end thereof, coveringly secured onto and then integrated with the first accommodating space of the housing body; a spring, the spring surrounding the outer edge of the projectingly connected portion of the covered cylinder far away from the housing body together with the covering body; a rotating body, the rotating body being provided at one end thereof with a second accommodating space provided for accommodating and coveringly positioning the projectingly connected portion of the covered cylinder around which the spring is provided, such that the spring and the covered cylinder are embeddedly combined together to be rotated, the rotating body being provided at one end far away from the second accommodating space with a second through-hole through which the projectingly connected portion of the covered cylinder penetrates; a closure cap, the closure cap being coveringly connected over the outer edge of the projectingly connected portion of the covered cylinder and synchronously rotated therewith; and a securing part, the securing part being directed away from one end of the housing body while combined with and fixed to the closure cap and the projectingly connected portion of the covered cylinder.

Further, the embeddedly projecting rod at one end of the housing body is provided with a hole, and the first accommodating space at one end of the housing body far away from the embeddedly projecting rod is provided with an opening, the opening being provided within the top edge thereof with a recessed surface, and the opening is provided at the circumference thereof with two fastening slots in opposite positions, respectively, a projecting rod being further extendingly provided within the first accommodating space at the center of the bottom edge thereof.

Further, the column of the covered cylinder is provided in the form of a triangular prism and cuttingly provided at the center thereof with a first circular hole for the projecting rod of the housing body to be embeddedly covered, and lubricating oil is injected around the column of the covered cylinder and inside the slight gap of the first accommodating space. The projectingly connected portion is provided with a first projecting portion, over which the oil seal is coveringly provided and against which one side of the blocking projecting ring is abutted, a second projecting portion provided for the spring to surround the outside thereof and allowed to penetrate through the second through-hole of the rotating body, and a third projecting portion having a surface provided as a hexagonal plane, the projecting portions extending outwardly from one end of the blocking projecting ring in turn, while outer diameters of the projecting portions being decreased gradually with respect to the outer diameter of the blocking projecting ring. A second circular hole is provided within the first projecting portion, the second projecting portion and the third projecting portion, and is opposite to the first circular hole, correspondingly, in which the first circular hole and the second circular hole are not perforated therebetween. Furthermore, at the end of the second circular hole, an internally threaded section is provided.

Further, the covering body is provided at the center thereof with a first through-hole through which the first projecting portion of the covered cylinder penetrates, and the covering body is provided at one end thereof with a projectingly embedded body embeddedly connected to the recessed surface at the top edge of the opening of the housing body. Furthermore, the covering body is provided at each of opposite positions on the outer edge thereof with a fastening body mutually fastened to each of the fastening slots of the housing body, such that the covering body and the housing body are coveringly secured and integrated into one unit.

Further, the closure cap is provided at one end embeddedly connected to the third projecting portion, provided as a hexagonal plane, of the covered cylinder with a hexagonal hole, and the closure cap is provided at one end far away from the hexagonal hole with a third through-hole, in which the securing part is provided as a screw so as to be penetrated into the third through-hole of the closure cap and threadedly connected with the internally threaded section of the covered cylinder.

Further, the spring is extendingly provided at one end thereof with a projecting end of spring, in which the second accommodating space of the rotating body is formed at the inner rim thereof with a channel for the projecting end of spring of the spring to be situated and then positioned.

Various advantages and features are provided by the present invention as described below.

1. The whole assembled buffer device of the present invention is reduced in outer diameter, and thus not only applicable to the small-sized roller shade used on the door/window, but also applicable to the small-sized roller shade used within the car door of limited thickness, so as to achieve a wide application.

2. The buffer device is used in the present invention to enable not only smooth draw, but also slowed-down furl, as well as a reduced coefficient of friction therein and reduction in noise generated in the drawing or furling process. A handier operation is certainly provided for a user.

3. The buffer device is used in the present invention, such that large noise generated due to a high coefficient of mutual friction is not resulted and the impact on auditory sensation is significantly reduced in a relative manner.

DETAILED DESCRIPTION OF THE PREFERRED EMBODIMENTS

The objects, technical contents, features and achieved effects of the present invention should be apparent through detailed description with respect to embodiments in conjunction with accompanying drawings.

Referring to FIGS. 5-8, a buffer device for small-sized roller shade is illustrated. A small-sized roller shade 2 of the present invention includes a rail 3, an adjustment device 4 mounted under one end of the rail 3, a buffer device 5 mounted under the other end, far away from the adjustment device 4, of the rail 3, a drawing and furling device 6 mounted between the adjustment device 4 and the buffer device 5, and a shade panel 7 furled around an outer edge of the drawing and furling device 6. In this case, the rail 3 is presented in the rectangle shape, and the rail 3 is provided inside thereof with an inverted U-shaped groove 31. The inverted U-shaped groove 31 is provided, from left side to right side, with the adjustment device 4, the drawing and furling device 6 (which is a conventional means and will not be described further herein) and an elastic element 61 thereof for adjusting tightness of the drawing and furling device 6, as well as the buffer device 5 to be installed. The adjustment device 4 is a conventional means and will not be described further herein.

Referring to FIGS. 7A and 7B again, the buffer device 5 includes a housing body 51, a covered cylinder 52, an oil seal 53, a covering body 54, a spring 55, a rotating body 56, a closure cap 57 and a securing part 58.

Figure 7A:
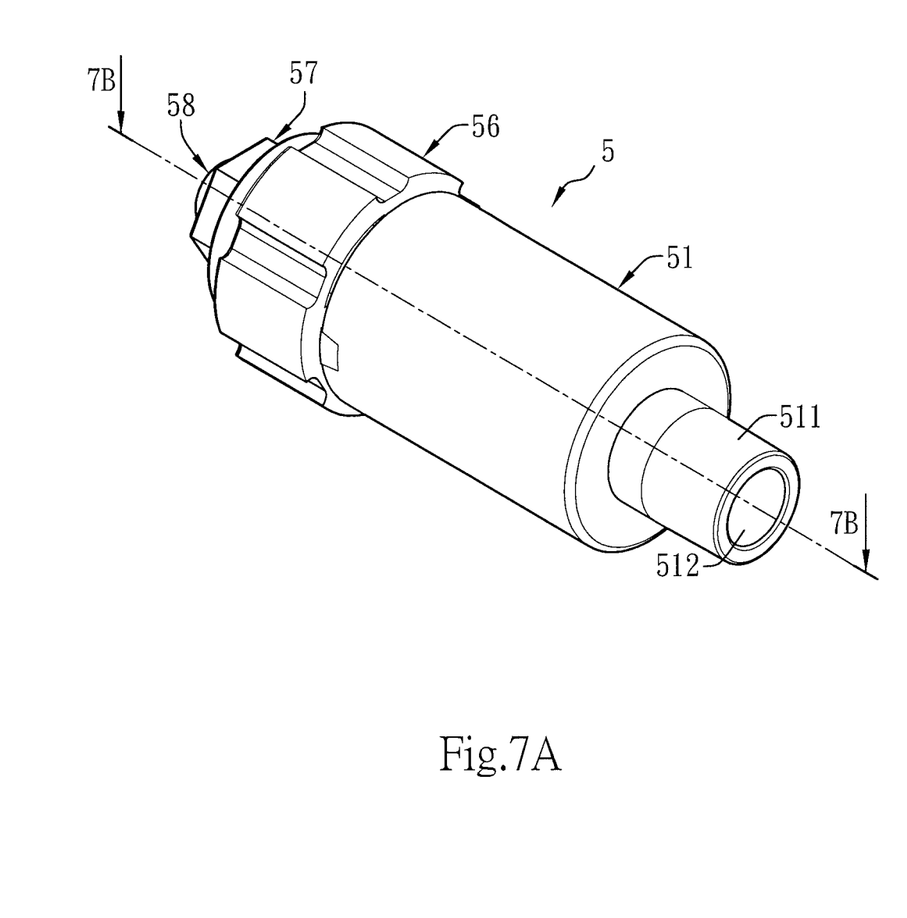
FIG. 7A is an assembled perspective view of a buffer device of FIG. 5.
Figure 7B:
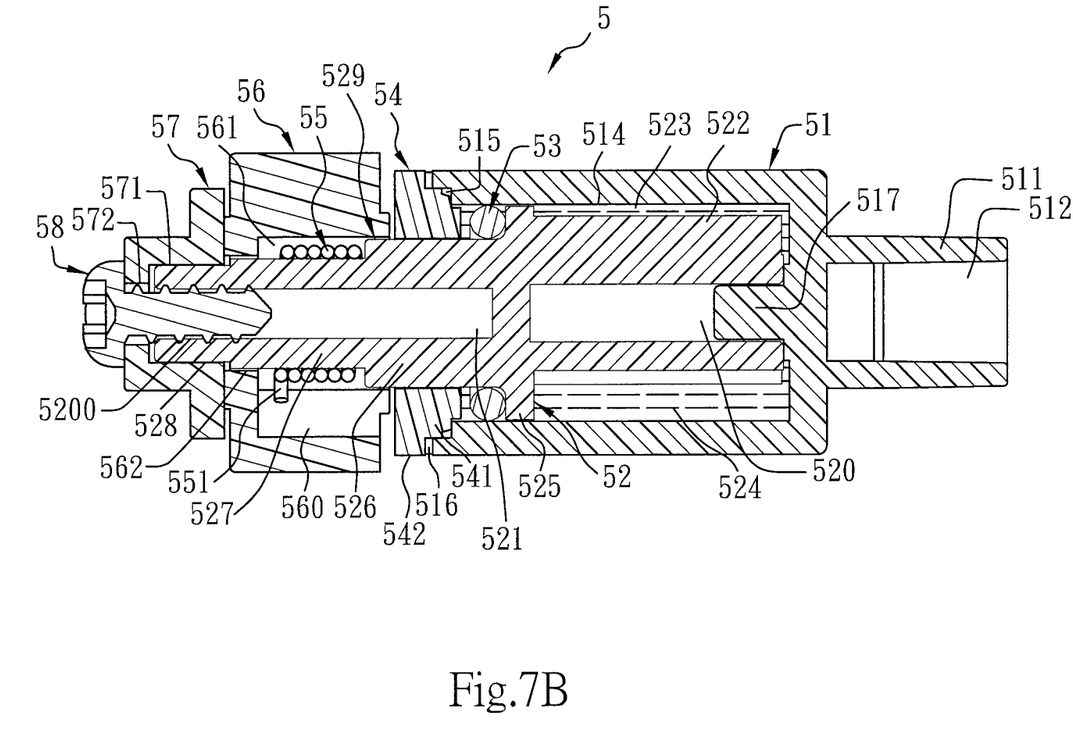
FIG. 7B is a cross section view at 7B-7B in FIG. 7A.

In this connection, the housing body 51 is provided at one end thereof with an embeddedly projecting rod 511 having a hole 512 at the center, and the housing body 51 is fixated within one end thereof far away from the embeddedly projecting rod 511 with a first accommodating space 514 having an opening 513. The opening 513 is provided within the top edge thereof with a recessed surface 515, and the opening 513 is provided at the circumference thereof with two fastening slots 516 in opposite positions, respectively.

Moreover, a projecting rod 517 is extendingly provided within the first accommodating space 514 at the center of the bottom edge thereof.

The covered cylinder 52 is provided with a column within the first accommodating space 514 of the housing body 51. The column is provided in the form of a triangular prism, and cuttingly provided at the center thereof with a first circular hole 520 for the projecting rod 517 of the housing body 51 to be embeddedly covered. A slight gap 523 is formed between each of corner ends 522 of the column and the first accommodating space 514, and lubricating oil 524 is injected around the column of the covered cylinder 52 and inside the slight gap 523 of the first accommodating space 514 as drag, so as to facilitate, due to a low coefficient of mutual friction, no noise generation and further no effect on auditory sensation, during the shade panel 7 is furled. The covered cylinder 52 is further coveringly provided with a blocking projecting ring 525 in correspondence with the first accommodating space 514 of the housing body 51; and provided with a projectingly connected portion 529 being far away from the column and extending toward one end of the blocking projecting ring 525, the projectingly connected portion 529 having a first projecting portion 526, a second projecting portion 527 and a third projecting portion 528 extending outwardly from one end of the blocking projecting ring 525 in turn, while outer diameters of the projecting portions are decreased gradually with respect to the outer diameter of the blocking projecting ring 525. More specifically, a second circular hole 521 is provided within the first projecting portion 526, the second projecting portion 527 and the third projecting portion 528, and is opposite to the first circular hole 520, correspondingly, in which the first circular hole 520 and the second circular hole 521 are not perforated therebetween. Furthermore, at the end of the second circular hole 521, an internally threaded section 5200 is provided. In the embodiment of the present invention, the surface of the third projecting portion 528 is provided as a hexagonal plane.

The oil seal 53 is coveringly provided over the outer edge of the first projecting portion 526 of the projectingly connected portion 529 of the covered cylinder 52 and abutted against one side of the blocking projecting ring 525. The covered cylinder 52 is sealed with respect to the interior of the first accommodating space 514 of the housing body 51 through the oil seal 53.

The covering body 54 is, at one end thereof, coveringly secured onto and then integrated with the first accommodating space 514 of the housing body 51. More specifically, the covering body 54 is provided at the center thereof with a first through-hole 540 through which the first projecting portion 526 of the covered cylinder 52 penetrates. Moreover, the covering body 54 is provided at one end thereof with a projectingly embedded body 541 embeddedly connected to the recessed surface 515 at the top edge of the opening 513 of the first accommodating space 514 of the housing body 51. Furthermore, the covering body 54 is provided at each of opposite positions on the outer edge thereof with a fastening body 542 mutually fastened to each of the fastening slots 516 of the housing body 51, in such a way that the covering body 54 is penetratedly provided over the outer edge of the first projecting portion 526 of the covered cylinder 52, as well as the projectingly embedded body 541 together with the housing body 51 and the fastening bodies 542 together with the fastening slots 516 are utilized, such that the covering body 54 and the housing body 51 are coveringly secured and integrated into one unit.

The spring 55 is directed away from the housing body 51 together with the covering body 54, and allowed to surround the outer edge of the second projecting portion 527 of the covered cylinder 52. The spring 55 is extendingly provided at one end thereof with a projecting end of spring 551.

The rotating body 56 is provided at one end thereof toward the second projecting portion 527 of the covered cylinder 52 with a second accommodating space 561. The second accommodating space 561 is formed at the inner rim thereof with a channel 560 communicated with the second accommodating space 561, the channel 560 being provided for covering the first projecting portion 526 of the covered cylinder 52 and accommodating the second projecting portion 527 of the covered cylinder 52 around which the spring 55 is provided, such that the projecting end of spring 551 of the spring 55 is situated and then positioned in the channel 560 on the inner rim of the second accommodating space 561, and thus the spring 55 and the covered cylinder 52 are embeddedly combined together to be rotated. Moreover, the rotating body 56 is provided at one end far away from the second accommodating space 561 with a second through-hole 562 through which the second projecting portion 527 of the covered cylinder 52 penetrates.

The closure cap 57 is provided at one end toward the third projecting portion 528 of the covered cylinder 52 with a hexagonal hole 571 for the hexagonal plane of the third projecting portion 528 to be embeddedly positioned. The closure cap 57 is provided at one end far away from the hexagonal hole 571 with a third through-hole 572.

The securing part 58 may be provided as a screw so as to be screwed into the third through-hole 572 of the closure cap 57 and threadedly connected with the internally threaded section 5200 at the end of the second circular hole 521 of the covered cylinder 52.

Figure 8:
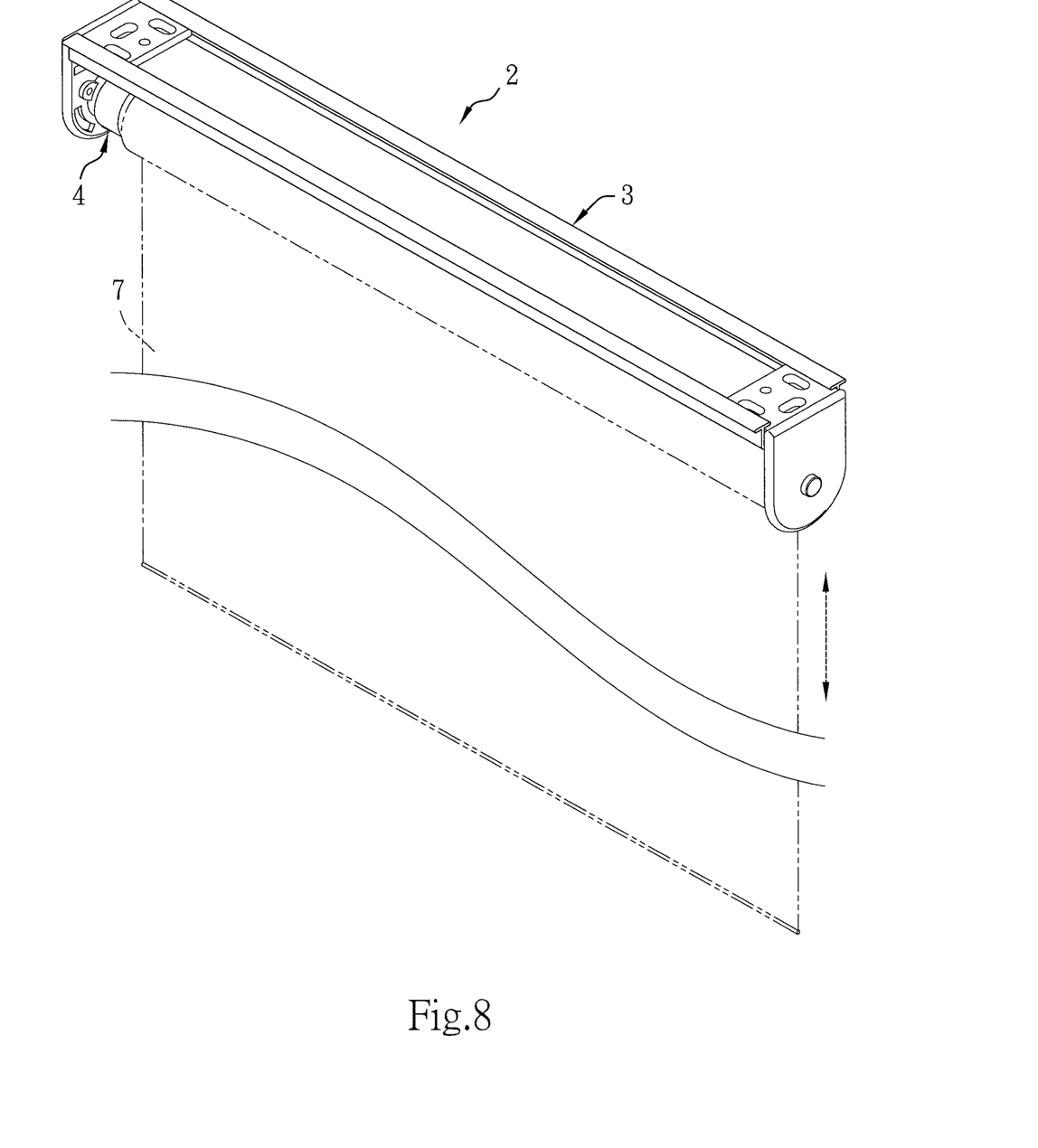
FIG. 8 is a perspective diagram showing the operation of a shade panel arranged with respect to FIG. 5.

The buffer device 5 of the small-sized roller shade 2 of the present invention is composed of the above components, as illustrated in FIGS. 7A, 7B and 8, such that when the components of any small-sized roller shade 2 are combined with the buffer device 5, it is always possible for the shade panel 7 to be drawn smoothly when the shade panel 7 is drawn desirably, in which the spring 55, around the outer edge of the second projecting portion 527 of the covered cylinder 52, of the buffer device 5 on the right side of the rail 3 is embeddedly combined with the covered cylinder 52 to be rotated (turned clockwise, not shown in the figures), such that the spring 55 is just presented in the freewheeling state outside of the covered cylinder 52 when the spring 55 around the outer edge of the covered cylinder 52 of the buffer device 5 is stretched outwardly, while the force of the spring 55 is set to be smaller than the pressure of the lubricating oil 524. Conversely, when the shade panel 7 is furled desirably (turned counter-clockwise, not shown in the figures), the spring 55 around the outer edge of the second projecting portion 527 of the covered cylinder 52 is presented in a fixed state, while the covered cylinder 52 is driven to rotate together. Nevertheless, the covered cylinder 52 is subject to retardation provided by the lubricating oil 524 outside of the covered cylinder 52 when rotated counter-clockwise, as well as the rotation and the retardation are interacted in opposite directions, such that the furling speed of the shade panel 7 is decreased and annoyance to wrinkles or impairment on the shade panel 7 due to speedy furl is then exempted.

Further, the whole assembled buffer device 5 of the embodiment of the present invention is reduced in outer diameter, and thus not only applicable to the small-sized roller shade 2 used on the door/window, but also applicable to the small-sized roller shade used within the car door of limited thickness. Thus, a wide application is achieved.

As described above, the buffer device 5 is used in the present invention to enable not only smooth draw, but also slowed-down furl, as well as a reduced coefficient of friction therein and reduction in noise generated in the drawing or furling process. Thus, a design allowing a handier operation to a user without affecting auditory sensation is certainly provided.

What is claimed is:

1. A buffer device for small-sized roller shade, said buffer device comprising:
    a housing body, including an embedded-convex rod disposed at one end of the housing body, and a first accommodating space formed inside the housing body adjacent to one end of the embedded-convex rod;
    a covered cylinder, provided with a column disposed within the first accommodating space of the housing body where a slight gap is formed between the column and the first accommodating space, a blocking projecting ring provided for correspondingly covering the first accommodating space of the housing body, and a projecting connected portion protruding from one end of the blocking projecting ring which is distal from the column;
    an oil seal, disposed on an outer edge of the projecting connected portion of the covered cylinder to seal the first accommodating space of the housing body;
    a covering body, disposed on the housing body to secure the first accommodating space and to integrated the covering body and the housing body together;
    a spring, disposed around the outer edge of the projecting connected portion of the covered cylinder which is distal from the housing body;
    a rotating body, including a second accommodating space disposed at a first end of the rotating body accommodated the projecting connected portion of the covered cylinder and the spring to position the spring and the covered cylinder embedded in the second accommodating space and rotated together, in the second accommodating space and penetrated by the projecting connected portion of the covered cylinder;
    a closure cap, disposed around the outer edge of the projecting connected portion of the covered cylinder and synchronously rotated therewith; and
    a securing part, set opposite to the end of the housing body to be fixed to the closure cap and the projecting connected portion of the covered cylinder.

2. The buffer device for small-sized roller shade according to claim 1, wherein the embedded-convex rod at the end of the housing body is provided with a hole, and the first accommodating space is provided with an opening disposed opposite to the end of the housing body and a projecting rod protruded from a center of bottom edge of the first accommodating space, and wherein, the opening includes with a recessed surface disposed at a top edge of the opening and two fastening slots disposed at a circumference of the opening in opposite positions.

3. The buffer device for small-sized roller shade according to claim 2, wherein the column of the covered cylinder is provided in form of a triangular prism and cuttingly provided at a center thereof with a first circular hole for the projecting rod of the housing body to be embedded therein covered, and an lubricating oil is injected around the column of the covered cylinder and inside the slight gap of the first accommodating space, and wherein the projecting connected portion includes a first projecting portion, over which the oil seal is covered and against which one side of the blocking projecting ring is abutted, a second projecting portion provided for the spring to surround the outside thereof and allowed to penetrate through the second through-hole of the rotating body, and a third projecting portion having a surface as a hexagonal plane, the projecting portions extending outwardly from the end of the blocking projecting ring in turn, while outer diameters of the projecting portions being decreased gradually with respect to the outer diameter of the blocking projecting ring, and wherein the first projecting portion, the second projecting portion and the third projecting portion form a second circular hole therein which is opposite to the first circular hole, and an internal thread is formed at one end of the second circular hole.

4. The buffer device for small-sized roller shade according to claim 3, wherein the covering body further comprises a first through-hole located at a center of the covering body and penetrated by the first projecting portion of the covered cylinder, a convex-embedded body disposed on one side of the covering body and connected to the recessed surface disposed at the top edge of the opening of the housing body, and two fastening bodies disposed on an outer edge of the covering body respectively fastened on the fastening slots of the housing body to secure and integrate the covering body and the housing body.

5. The buffer device for small-sized roller shade according to claim 3, wherein one side of the closure cap includes a hexagonal hole embedded in the third projecting portion of the covered cylinder, and another side of the closure cap includes a third through-hole for the securing part to penetrate, wherein the securing part is provided as a screw, and the screw is penetrated into the third through-hole of the closure cap to connect with the internal thread of the covered cylinder.

6. The buffer device for small-sized roller shade according to claim 1, wherein a projecting end is extended from one end of the spring, and wherein an inner rim of the second accommodating space of the rotating body is formed with a channel for the projecting end of spring of the spring to be situated and then positioned.

* * * * *